United States Patent Office 2,903,448
Patented Sept. 8, 1959

2,903,448

$\Delta^{8(9)}$-7-KETO-ALLOSTEROIDS AND PROCESSES OF PREPARING THEM

John M. Chemerda, Metuchen, and Theodore A. Jacob, Cranford, N.J., assignors to Merck & Co., Inc., Rahway, N.J., a corporation of New Jersey No Drawing. Application April 17, 1953
Serial No. 349,554

15 Claims. (Cl. 260—239.55)

This invention is concerned generally with steroid compounds having an oxygen atom attached to the carbon atom in the 7-position of the molecule and with processes for preparing these 7-oxygenated steroid compounds. More particularly, it relates to a novel process for converting $\Delta^7$-cyclopentanopolyhydrophenanthrene compounds of the allo series to the corresponding $\Delta^{8(9)}$-7-keto-allo-cyclopentanopolyhydrophenanthrene compounds, and to the intermediate compounds thus obtained. The $\Delta^{8(9)}$-7-keto-allo-cyclopentanopolyhydrophenanthrene compounds prepared in accordance with our novel procedure are valuable as intermediates in the synthesis of steroid compounds having an oxygen atom attached to the 11-carbon atom such as the adrenal hormones, cortisone and hydrocortisone.

The $\Delta^{8(9)}$-7-keto-allo-cyclopentanopolyhydrophenanthrene compound, subject of the present invention, have at rings B and C the following chemical structure:

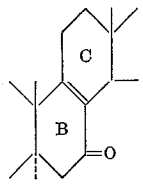

These $\Delta^{8(9)}$-7-keto-allo-cyclopentanopolyhydrophenanthrene compounds can be prepared as follows: A $\Delta^7$-allo-cyclopentanopolyhydrophenanthrene compound (Compound 1 hereinbelow) is reacted with a halogenating agent to form the corresponding $\Delta^{8(9)}$-7,11-dihalo-allo-cyclopentanopolyhydrophenanthrene compound (Compound 2) which is reacted with a compound of a metal whose halides are water-insoluble, thereby producing the corresponding $\Delta^{8(9)}$-7-keto-allo-cyclopentanopolyhydrophenanthrene compound (Compound 3).

The reactions indicated hereinabove may be chemically represented, insofar as the changes taking place in rings B and C are concerned, as follows:

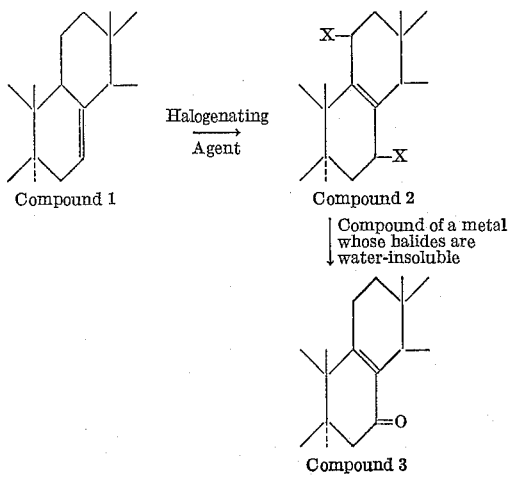

The $\Delta^7$-allo-cyclopentanopolyhydrophenanthrene compounds which we ordinarily employ as starting materials in our novel process are those having a sterol side chain attached to the carbon atom in the 17-position of the molecule as for example $\Delta^{7,22}$-ergostadiene compounds such as $\Delta^{7,22}$-3-acyloxy-ergostadiene, $\Delta^{7,22}$-3-acetoxy-ergostadiene, $\Delta^{7,22}$-stigmastadiene compounds, such as $\Delta^{7,22}$-3-acyloxy-stigmastadiene, $\Delta^{7,22}$-3-acetoxy-stigmastadiene, a degraded bile acid side chain attached to the 17-carbon atom such as $\Delta^7$-3-acyloxy-bisnorallocholenic acid, $\Delta^7$-3-acetoxy-bisnorallocholenic acid, a 17-acetyl substituent such as $\Delta^7$-3-acyloxy-20-keto-allopregnene, $\Delta^7$-3-acetoxy-20-keto-allopregnene, a sapogenin side chain as, for example, $\Delta^7$-dehydrotigogenin compounds such as $\Delta^7$-dehydrotigogenin acylate, $\Delta^7$-dehydrotigogenin acetate, and the like.

These $\Delta^7$-allo-cyclopentanopolyhydrophenanthrene compounds utilized as starting materials in our process, can be prepared starting with the readily available $\Delta^5$-cyclopentanopolyhydrophenanthrene compounds, such as ergosterol, diosgenin, and the like, by treating said $\Delta^5$-allo-cyclopentanopolyhydrophenanthrene compound (Compound 4 hereinbelow) with N-bromosuccinimide to form the corresponding $\Delta^5$-7-bromo-cyclopentanopolyhydrophenanthrene compound (Compound 5), reacting the latter compound with a tertiary amine to form the corresponding $\Delta^{5,7}$-cyclopentanopolyhydrophenanthrene compound (Compound 6), and reacting said $\Delta^{5,7}$-cyclopentanopolyhydrophenanthrene compound with hydrogen in the presence of Raney nickel catalyst thereby selectively reducing the unsaturated linkage attached to the C–5 carbon atom to form the corresponding $\Delta^7$-allo-cyclopentanopolyhydrophenanthrene compound (Compound 1). The reactions indicated hereinabove may be chemically represented, insofar as the chemical changes taking place in rings B and C are concerned, as follows:

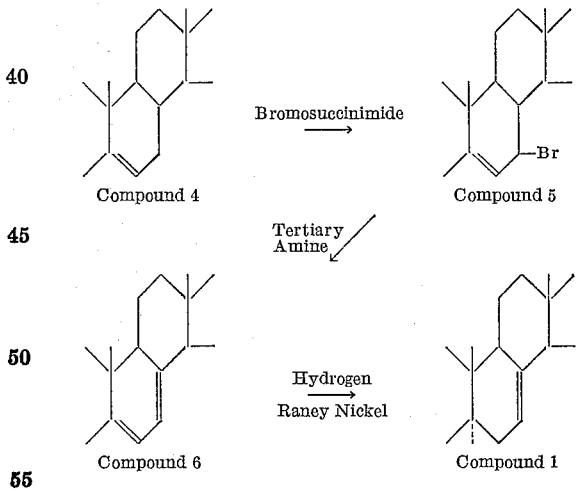

As set forth hereinabove, our novel process for converting $\Delta^7$-allo-cyclopentanopolyhydrophenanthrene compounds to the corresponding $\Delta^{8(9)}$-7-keto-allo-cyclopentanopolyhydrophenanthrene compound involves reacting said $\Delta^7$-allo-cyclopentanopolyhydrophenanthrene compound with a halogenating agent and reacting the halogenated intermediate thus obtained with a compound of a metal whose halides are substantially water-insoluble. We ordinarily conduct this halogenation reaction utilizing a brominating agent since the bromination reaction takes place readily with the formation of high yields of the corresponding polybrominated intermediate, and because this polybrominated intermediate reacts readily with a compound of a metal whose halides are substantially water-insoluble to produce the desired $\Delta^{8(9)}$-7-keto-allo-cyclopentanopolyhydrophenanthrene compound. We ordinarily employ bromine as the brominating agent. The optimum amount of bromine for the reaction is three to five moles of bromine per mole of steroid, when the compound used as starting material is a $\Delta^7$-allo-cyclopentanopolyhydrophenanthrene compound containing an unsaturated C–17 side chain as, for example, a $\Delta^{7,22}$-ergostadiene compound, a $\Delta^{7,22}$-stigmastadiene compound, and the like. When the compound used as starting material is a $\Delta^7$-allo-cyclopentanopolyhydrophenanthrene compound containing a saturated C–17 side chain as, for example, a $\Delta^7$-dehydrosapogenin such as $\Delta^7$-dehydrotigogenin, optimum results are secured with as little as two moles of bromine per mole of the $\Delta^7$-allo-cyclopentanopolyhydrophenanthrene compound. The larger requirement for bromine in the case of the steroid compounds containing an unsaturated side chain can be explained by the fact that the olefinic linkage in the side chain is readily brominated, thus consuming one additional mole of reagent, whereas substitution of bromine in a saturated steroid side chain takes place relatively slowly.

The bromination reaction is ordinarily conducted by adding bromine to a solution of the $\Delta^7$-allo-cyclopentanopolyhydrophenanthrene compound, preferably in the cold. As solvent for the reaction, we employ an organic solvent substantially inert to halogenation as, for example, a chlorinated hydrocarbon solvent such as chloroform, carbon tetrachloride, a hydrocarbon solvent such as toluene, a dialkyl ether such as diethyl ether, dibutyl ether, and the like.

The temperature at which the bromination reaction can be carried out is determined by the stability of the polybrominated intermediates in the particular solvent utilized for the reaction, and also by the freezing point of said solvent. For example, when carbon tetrachloride (which freezes at about $-23°$ C.) is employed, we have found that the reaction can be conducted at a temperature of about $-20°$ C. since the polybrominated intermediates are relatively stable in carbon tetrachloride solution at this temperature. When halogenated solvents other than carbon tetrachloride, or when dialkyl ethers are used as the reaction medium, it has been found, however, that the polybrominated intermediates are relatively unstable at temperatures above $-25°$ C.; when these latter solvents are employed, we ordinarily employ reaction temperatures below $-30°$ C. It is presently preferred to conduct the reaction utilizing chloroform as the solvent for the reaction, this solvent having been found to give optimum yields, and to employ a temperature within the range of about $-50°$ C. to $-65°$ C. If desired, the bromination reaction can be carried out utilizing temperatures substantially below $-65°$ C. utilizing ethereal solutions as the solvent medium. At such low reaction temperatures, however, the rate of reaction is substantially decreased, and the high yields obtained using our preferred reaction conditions, chloroform at about $-50$ to $-65°$ C., are not greatly improved.

The time required for carrying out the bromination reaction varies somewhat depending on mechanical factors such as efficiency of mixing, etc. The rate at which the reaction takes place is, however, readily ascertainable by observance of the disappearance of the bromine color from the reaction solution. Where two moles of bromine are reacted with one mole of a $\Delta^7$-allo-cyclopentanopolyhydrophenanthrene compound containing a saturated C–17 side chain, or where three moles of bromine are reacted with one mole of a $\Delta^{7,22}$-allo-cyclopentanopolyhydrophenanthrene compound, the completion of the reaction is readily detected by the complete disappearance of the bromine color from the reaction solution. Where bromine is employed slightly in excess of the above ratios, the bromine-induced color disappears very slowly, and when the excess bromine is of the order of one molecular equivalent, the bromine color is never discharged completely. We have ascertained that, utilizing our preferred solvent and reaction temperature, and employing four molecular equivalents of bromine per mole of $\Delta^7$-allo-cyclopentanopolyhydrophenanthrene compound the reaction is ordinarily complete after a reaction period of about four hours.

The method of bringing the reactants together in the reaction solution is not critical. The bromine can be added portionwise, either as liquid bromine or dissolved in an organic solvent inert to bromine, directly to the cold solution containing the $\Delta^7$-allo-cyclopentanopolyhydrophenanthrene compound. Alternatively, a solution of bromine in the reaction solvent, and a solution of the steroid compound, both cooled to the reaction temperature, can be rapidly, and the resulting mixture stirred until the bromination reaction is substantially complete.

Instead of utilizing bromine alone as the brominating agent, we can use an N-bromamide such as N-bromosuccinimide, N-bromoacetamide, and the like, in conjunction with a relatively small amount of bromine which serves to initiate the reaction. The quantity of bromine which we use ranges, depending on whether or not the $\Delta^7$ - allo - cyclopentanopolyhydrophenanthrene compound contains an unsaturated C–17 side chain, from a trace of bromine up to an amount slightly in excess of one molecular equivalent. The N-bromamide apparently does not brominate directly but, instead, serves as a source of free bromine in the following way. The free bromine used in conjunction with the N-bromamide undergoes a substitution reaction with the $\Delta^7$-allo-cyclopentanopolyhydrophenanthrene compound with the resultant formation of free hydrogen bromide; the hydrogen bromide, thus liberated, reacts with the N-bromamide thereby generating additional bromine which, in turn, undergoes reaction with the steroid compound. The foregoing cycle is repeated until formation of the polybrominated intermediate is complete. In $\Delta^7$-allo-cyclopentanopolyhydrophenanthrene compounds having a saturated C–17 side chain, as for example, in compounds belonging to the sapogenin series, only a trace of bromine or of hydrobromic acid itself need be used in conjunction with the N-bromamide. Trace amounts of bromine suffice here because reactions involving $\Delta^7$-allo-cyclopentanopolyhydrophenanthrene compounds are substitution reactions; hydrobromic acid is thus continually liberated, and will, in turn, continually generate bromine by reaction with the N-bromamide component of the reaction mixture. In the case of $\Delta^7$-allo-cyclopentanopolyhydrophenanthrene compounds containing an unsaturated C–17 side chain such as $\Delta^{7,22}$-ergostadiene compounds and $\Delta^{7,22}$-stigmastadiene compounds, we ordinarily utilize a slight excess above one molecular equivalent of bromine in conjunction with the N-bromamide. This is necessary because the addition of bromine at the $\Delta^{22}$-ethylenic linkage (which takes place concurrently with nuclear bromination in rings B and C) does not produce the hydrobromic acid essential for generating additional bromine by reaction with the N-bromamide. Irrespective of whether the $\Delta^7$-allo-cyclopentanopolyhydrophenanthrene compound contains a saturated or unsaturated C–17 side chain, we ordinarily utilize two to three moles of the N-bromamide per mole of the steroid compound. We prefer to use approximately two moles of N-bromosuccinimide.

Instead of utilizing a brominating agent, we can also employ a chlorinating agent as, for example, chlorine or an N-chloroamide as N-chloroacetamide, N-chlorosuccinimide, and the like, in conjunction with a relatively small amount of chlorine or of hydrogen chloride to initiate the reaction in accordance with the reaction mechanism described hereinabove in connection with the employment of the N-bromamides. The reaction conditions which we use when employing these chlorinating agents are substantially identical to those used with the corresponding brominating agents, and the polychlorinated intermediates thus formed correspond in structure to the polybrominated intermediates referred to hereinabove. We prefer to use the brominating agents, however, for the reason that the polychlorinated intermediates are less readily dehalogenated than the corresponding polybrominated derivatives. Other halogenating agents such as iodinating agents, fluorinating agents, and the like, are unsatisfactory in our overall procedure, since the iodinating agents are not sufficiently active to form the corresponding polyiodinated intermediates and since, in cases where fluorinating agents are employed, defluorination of the polyfluorinated intermediate has not proven to be practical.

In accordance with the foregoing halogenation procedure, there are obtained novel polyhalogenated steroid compounds including $\Delta^{8(9)}$-7,11-dihalo-allo-cyclopentanopolyhydrophenanthrene compounds as, for example, $\Delta^{8(9)}$-7,11,22,23-tetrahalo-ergostene compounds such as $\Delta^{8(9)}$ - 3 - acyloxy - 7,11,22,23 - tetrahalo - ergostene, $\Delta^{8(9)}$ - 3 - acyloxy - 7,11,22,23 - tetrabromo - ergostene, $\Delta^{8(9)}$ - 3 - acetoxy - 7,11,22,23 - tetrabromo-ergostene, $\Delta^{8(9)}$ - 3 - acetoxy - 7,11,22,23 - tetrachloro - ergostene, $\Delta^{8(9)}$ - 7,11,22,23 - tetrahalo-stigmastene compounds such as $\Delta^{8(9)}$ - 3 - acyloxy - 7,11,22,23 - tetrahalo - stigmastene, $\Delta^{8(9)}$ - 3 - acyloxy - 7,11,22,23 - tetrabromo-stigmastene, $\Delta^{8(9)}$ - 3 - acetoxy - 7,11,22,23 - tetrabromo-stigmastene, $\Delta^{8(9)}$ - 3 - acetoxy - 7,11,22,23 - tetrachloro-stigmastene, $\Delta^{8(9)}$ - 7,11 - dihalo - dehydrosapogenin compounds, $\Delta^{8(9)}$ - 7,11 - dihalo - dehydrotigogenin compound such as $\Delta^{8(9)}$-7,11-dihalo-dehydrotigogenin acylate, $\Delta^{8(9)}$-7,11-dibromo-dehydrotigogenin acylate, $\Delta^{8(9)}$ - 7,11 - dibromo - dehydrotigogenin acetate, $\Delta^{8(9)}$-7,11 - dichloro - dehydrotigogenin acetate, $\Delta^{8(9),22}$-7,11-dihalo-ergostadiene compounds such as $\Delta^{8(9),22}$-3-acetoxy - 7,11 - dibromo - ergostadiene, $\Delta^{8(9),22}$ - 3 - acetoxy - 7,11 - dichloro - ergostadiene, $\Delta^{8(9),22}$ - 7,11-dihalo-stigmastadiene compounds such as $\Delta^{8(9),22}$ - 3-acyloxy - 7,11 - dibromo - stigmastadiene, $\Delta^{8(9),22}$ - 3-acetoxy - 7,11 - dibromo - stigmastadiene, $\Delta^{8(9),22}$ - 3-acetoxy - 7,11 - dichloro - stigmastadiene, as well as polybrominated intermediates containing four bromo substituents attached in rings B and C as, for example 7,8,9,11,22,13-hexahaloergostane compounds such as 3-acyloxy - 7,8,9,11,22,23 - hexabromoergostane, 3 - acetoxy-7,8,9,11,22,23-hexabromoergostane, 7,8,9,11,22,23-hexachloroergostane, 7,8,9,11,22,23-hexahalo-stigmastane compounds such as 3-acyloxy-7,8,9,11,22,23-hexabromo-stigmastane, 3 - acetoxy - 7,8,9,11,22,23 - hexabromo-stigmastane, 7,8,9,11-tetrahalo-tigogenin compounds such as 7,8,9,11-tetrabromo-tigogenin acylate, 7,8,9,11-tetrabromo-tigogenin acetate, and polyhalogenated sapogenin compounds wherein the saturated C–17 side chain contains one or more bromo or chloro substituents and the like.

The novel polyhalogenated steroid compounds which may be prepared in accordance with our process also include $\Delta^7$ - 9,11 - dihalo - allo - cyclopentanopolyhydrophenanthrene compounds, as for example, $\Delta^7$-3-acyloxy-9,11,22,23 - tetrahalo - ergostene, $\Delta^7$ - 3 - acetoxy - 9,11, 22,23 - tetrabromo-ergostene, $\Delta^7$ - 3 - acyloxy - 9,11,22,23-tetrahalo - stigmastene, $\Delta^7$ - 3 - acetoxy - 9,11,22,23-tetrabromo - stigmastene, $\Delta^7$ - 9,11 - dihalo - dehydrotigogenin acylate, $\Delta^7$-9,11-dibromo-dehydrotigogenin acetate, as well as $\Delta^{9(11)}$-7,8-dihalo-allo-cyclopentanopolyhydrophenanthrene compounds, as for example, $\Delta^{9(11)}$-3-acyloxy - 7,8,22,23 - tetrahalo - ergostene, $\Delta^{9(11)}$ - 3-acetoxy - 7,8,22,23 - tetrabromo - ergostene, $\Delta^{9(11)}$ - 3-acyloxy - 7,8,22,23 - tetrahalo - stigmastene, $\Delta^{9(11)}$ - 3-acetoxy - 7,8,22,23 - tetrabromo - stigmastene, $\Delta^{9(11)}$-7,11 - dihalo - dehydrotigogenin acylate, $\Delta^{9(11)}$ - 7,11-dibromo-dehydrotigogenin acetate, and the like. These $\Delta^7$ - 9,11 - dihalo - allo - cyclopentanopolyhydrophenanthrene compounds and $\Delta^{9(11)}$-7,8-dihalo-allo-cyclopentanopolyhydrophenanthrene compounds ordinarily rearrange, however, due to allylic migration of the tertiary bromine attached to the C–9 carbon atom, to produce the corresponding $\Delta^8$ - 7,11 - dihalo - allo - cyclopentanopolyhydrophenanthrene compounds.

As set forth hereinabove, we ordinarily employ, per mole of $\Delta^7$-allo-cyclopentanopolyhydrophenanthrene compound, at least two moles of halogen, or at least two moles of N-haloamide in conjunction with a trace amount of halogen or hydrogen halide, supplemented, in either case, by an additional mole of halogen where the $\Delta^{8(9)}$-allo-cyclopentanopolyhydrophenanthrene compound contains an unsaturated C–17 side chain. We have found that, when lower molar ratios of bromine, chlorine, N - bromacetamide, N - chloracetamide, N - bromsuccinimide or N-chlorsuccinimide are employed, the product of the halogenation reaction is a partially halogenated intermediate, which, upon reaction with the metal compound, is converted to the desired $\Delta^8$-7-keto-allo-cyclopentanopolyhydrophenanthrene compound in poor yield and in impure form. Our procedure, however, utilizing the specified proportion of halogenating agent, ordinarily results in the obtainment of the desired $\Delta^8$-7-keto-allo-cyclopentanopolyhydrophenanthrene compound in a yield approaching 90% of that theoretically obtainable.

The reaction between the polybrominated or polychlorinated $\Delta^{8(9)}$ - allo - cyclopentanopolyhydrophenanthrene compound and the compound of a metal whose halide is water-insoluble is carried out by bringing the reactants together in contact with an aqueous medium. We ordinarily utilize an excess (at least about 10% and preferably 75–100%) of the compound of the metal. The metal compounds, that is metal salts and metal oxides, which we ordinarily employ can be characterized as having a cation which forms insoluble halides and an anion which is non-reactive with steroid compounds of which forms anionic derivatives capable of conversion to ketones, and include silver compounds such as silver nitrate, silver acetate, silver oxide, mercurous compounds such as mercurous nitrate, mercurous acetate, lead compounds such as lead nitrate, lead acetate, and the like.

The reaction between said metal salt or oxide and the $\Delta^{8(9)}$-polyhalogenated - allo - cyclopentanopolyhydrophenanthrene compound is conveniently conducted by adding the metal compound directly to the halogenation mixture without isolating the intermediate polyhalogenated steroid compound. The metal salt or metal oxide is usually added to the halogenation reaction solution containing the $\Delta^{8(9)}$-polyhalogenated steroid compound in the form of a solution or suspension in aqueous acetone or alcohol, although solid suspensions of the metal compound in water can be utilized, if desired. The presence of at least traces of water appears necessary to promote hydrolysis of any C–7 substituted intermediates to the C–7 ketone.

The solvent utilized in the reaction between the $\Delta^{8(9)}$-polyhalogenated steroid compound and the metal compound is not critical, and other solvents as, for example, dialkyl ethers, lower alkanols, and the like, can be utilized at the low temperature employed. Where the $\Delta^{8(9)}$-polyhalogenated steroid intermediate is not isolated, however, we prefer to use the halogenated hydrocarbon solvents, such as chloroform and carbon tetrachloride, which are commonly employed as the medium for the halogenation reaction.

We usually employ a low initial reaction temperature (about $-60°$ C.) in view of the fact that the polyhalogenated intermediate is somewhat unstable in the halogenated hydrocarbon reaction solvent. Somewhat higher temperatures can be used, if desired, up to approximately $-30°$ C. in a chloroform medium, and up to about $-10°$ C. to $-20°$ C. in carbon tetrachloride or toluene. The reaction time may be varied from about ten minutes up to approximately five hours or longer, and the $\Delta^{8(9)}$-7-keto-allo-cyclopentanopolyhydrophenanthrene compound is isolated from the reaction mixture by filtering the precipitated metal halide and evaporating the filtered solution to dryness. The $\Delta^{8(9)}$-7-keto-allo-cyclopentanopolyhydrophenanthrene compound thus obtained can be purified by recrystallization from an organic solvent such as lower alkanol.

Although, as set forth hereinabove, the reaction between the metal compound and the $\Delta^{8(9)}$-polyhalogenated steroid compound is ordinarily carried out directly on the halogenation reaction mixture without isolating the polyhalogenated intermediate, the $\Delta^{8(9)}$-polybrominated or polychlorinated steroid compound can be isolated, if desired, prior to reacting it with the metal compound. This isolation is ordinarily achieved by adding to the halogenation solution an oxygenated organic solvent miscible with said solution as, for example, a lower dialkyl ketone such as acetone, or a lower alkanol such as methanol or ethanol, whereupon the polybrominated or polychlorinated steroid compound precipitates and is recovered by filtration or centrifugation. This isolation procedure is ordinarily conducted at temperatures below about −10° C. due to the instability of the halogenated intermediate in the usual reaction solvent, chloroform. Where carbon tetrachloride is used as the halogenation solvent, however, the dilution of the reaction mixture with the alkanol or ketone can be conducted at higher temperatures, even up to room temperature, without appreciable decomposition of the polyhalogenated steroid compound. The isolated, dried, polybrominated and polychlorinated steroids obtained in accordance with our halogenation procedure are moderately stable at ordinary temperatures, and their physical properties are thus readily ascertainable.

The polybrominated or polychlorinated steroid compounds (such as our preferred $\Delta^{8(9)}$-7,11-dihalo-allo-cyclopentanopolyhydrophenanthrene compounds) which can be isolated as set forth hereinabove, are then reacted with the metal salt or metal oxide characterized as having a cation which forms insoluble halides and an anion which forms anionic derivatives capable of giving rise to steroid ketones utilizing substantially the same reaction conditions as those employed in the direct treatment of the halogenation reaction solution. While this modification in our process can also be conducted in a halogenated hydrocarbon solvent such as chloroform, carbon tetrachloride, and the like, it may be convenient to utilize a dialkyl ether, a lower alkanol, and the like, at the low temperatures utilized in this reaction.

In accordance with our procedure wherein a $\Delta^{8(9)}$-7,11-dihalo-allo-cyclopentanopolyhydrophenanthrene compound is reacted with a compound of a metal whose halides are substantially water-insoluble, the halogen substituents are removed from the B and C rings of the nucleus with the formation of the corresponding $\Delta^{8(9)}$-7-keto-allo-cyclopentanopolyhydrophenanthrene compound, but any halogen substituents which may be attached to the C–17 side chain are not attached. When a $\Delta^{8(9)}$-7,11-dihalo-allo-cyclopentanopolyhydrophenanthrene compound containing one or more halogen substituents attached to the C–17 side chain as, for example, a $\Delta^{8(9)}$-7,11,22,23-tetrabromo-ergostene compound such as $\Delta^{8(9)}$-3-acetoxy-7,11,22,23-tetrabromo-ergostene, a $\Delta^{8(9)}$-7,11,22,23-tetrahalo-stigmastene compound such as $\Delta^{8(9)}$-3-acetoxy-7,11,22,23-tetrabromo-stigmastene, a $\Delta^{8(9)}$-7,11-dihalo-dehydrotigogenin compound containing a halogen substituent attached to the C–17 side chain such as 7,11,23-tribromo-tigogenin acetate, a 7,8,9,11-tetrahalo-allo-cyclopentanopolyhydrophenanthrene compound containing one or more halogen substituents attached to the C–17 side chain, as, for example, a 7,8,9,11,22,23-hexahalo-ergostane compound such as 3-acetoxy-7,8,9,11,22,23-hexabromo-ergostane, a 7,8,9,11,22,23-hexahalo-stigmastane compound such as 3-acetoxy-7,8,9,11,22,23-hexabromo-stigmastane, a 7,8,9,11-tetrahalo-tigogenin compound containing a halo substituent in the C–17 side chain such as 7,8,9,11,23-pentabromo-tigogenin acetate and the like, is reacted with a metal compound whose halides are substantially water-insoluble, there is obtained the corresponding $\Delta^{8(9)}$-7-keto-cyclopentanopolyhydrophenanthrene compound wherein the halo substituent or substituents attached to the C–17 side chain are unaffected, as for example, a $\Delta^{8(9)}$-7-keto-22,23-dihalo-ergostene compound such as $\Delta^{8(9)}$-3-acyloxy-7-keto-22,23-dihalo-ergostene, $\Delta^{8(9)}$-3-acetoxy-7-keto-22,23-dibromo-ergostene, $\Delta^{8(9)}$-3-acetoxy-7-keto-22,23-dichloro-ergostene, a $\Delta^{8(9)}$-7-keto-22,23-dihalo-stigmastene compound such as $\Delta^{8(9)}$-3-acyloxy-7-keto-22,23-dihalo-stigmastene, $\Delta^{8(9)}$-3-acetoxy-7-keto-22,23-dibromo-stigmastene, $\Delta^{8(9)}$-3-acetoxy-7-keto-22,23-dichloro-stigmastene, a $\Delta^{8(9)}$-7-keto-dehydrotigogenin compound containing a halo substituent attached to the C–17 side chain such as $\Delta^{8(9)}$-7-keto-23-halo-dehydrotigogenin acylate, $\Delta^{8(9)}$-7-keto-23-bromo-dehydrotigogenin acetate, and the like.

Although the $\Delta^7$-allo-cyclopentanopolyhydrophenanthrene compounds having a hydroxyl substituent attached to the C–3 carbon atom, such as $\Delta^{7,22}$-3-hydroxy-ergostadiene, $\Delta^{7,22}$-3-hydroxy-stigmastadiene, $\Delta^7$-3-hydroxy-dehydrotigogenin, are ordinarily reacted with an acylating agent to convert the 3-hydroxy substituent to an acyloxy radical prior to the halogenation reaction, both the halogenation operation and the subsequent reaction with a metal compound whose halides are substantially water-insoluble can be conducted utilizing compounds such as α-dihydroergosterol, 7-dehydrotigogenin, and the like, which possess free hydroxyl groups.

The $\Delta^{8(9)}$-7-keto-allo-cyclopentanopolyhydrophenanthrene compound containing one or more halogen substituents attached to the C–17 side chain, prepared as set forth hereinabove, can be dehalogenated, if desired, by reaction with a bivalent metal such as zinc, magnesium, and the like, in conjunction with an acid, preferably a lower alkanoic acid such as acetic acid. The reaction is normally conducted at the reflux temperature of the alkanoic acid. In accordance with this hehalogenation procedure, there is obtained a $\Delta^{8(9)}$-7-keto-allo-cyclopentanopolyhydrophenanthrene compound free of halogen substituents in the C–17 side chain, as for example, a $\Delta^{8(9),22}$-7-keto-ergostadiene compound such as $\Delta^{8(9),22}$-3-acyloxy-7-keto-ergostadiene, $\Delta^{8(9),22}$-3-acetoxy-7-keto-ergostadiene, a $\Delta^{8(9),22}$-7-keto-stigmastadiene compound such as $\Delta^{8(9),22}$-3-acyloxy-7-keto-stigmastadiene, $\Delta^{8(9),22}$-3-acetoxy-7-keto-stigmastadiene, a $\Delta^{8(9)}$-7-keto-dehydrosapogenin compound, more particularly, a $\Delta^{8(9)}$-7-keto-dehydrotigogenin compound such as $\Delta^{8(9)}$-7-keto-dehydrotigogenin acylate, $\Delta^{8(9)}$-7-keto-dehydrotigogenin acetate, and the like.

The following examples illustrate methods of carrying out the present invention, but it is to be understood that these examples are given for purposes of illustration and not of limitation.

EXAMPLE 1

Ten grams (0.0227 mole) of $\Delta^{7,22}$-3-acetoxy-ergostadiene were dissolved in 200 ml. of dry chloroform, and the solution was cooled to a temperature of approximately −65° C. To this solution was added, over a period of one hour, while maintaining the temperature of the solution at approximately −65° C., a solution containing 10.0 g. (0.0681 mole) of bromine in 200 ml. of dry chloroform. The resulting solution was stirred for an additional period of ninety minutes while maintaining the temperature at about −65° C.

To the chloroform reaction solution was then added 31.6 g. (0.136 mole) of moist silver oxide, and the resulting suspension was stirred for a period of approximately forty-five minutes at a temperature of −60 to −65° C. The suspension was allowed to warm to about room temperature over a two-hour period, the precipitated silver bromide was separated by filtration, and the filtered solution was evaporated to dryness in vacuo. The residual light yellow powder was recrystallized from methanol to give $\Delta^{8(9)}$-3-acetoxy-7-keto-22,23-dibromo-ergostene; M.P. 198–210° C. $[\alpha]_D = +12.6°$ (chloroform); $\lambda$ max.$=2515$ A.; E percent$=82$ (methanol).

Six grams of $\Delta^{8(9)}$-3-acetoxy-7-keto-22,23-dibromo-ergostene were dissolved in 200 ml. of chloroform, 6.0 g. of zinc dust and 20 ml. of glacial acetic acid were added to the chloroform solution, and the resulting mixture was stirred at approximately room temperature for a period of ninety minutes. The reaction mixture was filtered, and the filtered chloroform solution was extracted with water. The washed chloroform reaction solution was evaporated to dryness to give, as a residual crystalline material $\Delta^{8(9),22}$-3-acetoxy-7-keto-ergostadiene.

Two grams of $\Delta^{8(9),22}$-3-acetoxy-7-keto-ergostadiene were dissolved in 40 ml. of methanol containing 10 ml. of benzene, and to the solution was added a solution containing 1.0 g. of potassium hydroxide in 20 ml. of methanol. The resulting mixture was warmed to a temperature of about 50° C., and the solution was allowed to cool to room temperature over a period of about one and one-half hours. The reaction solution was extracted with water, and the organic layer was evaporated in vacuo to give a residual yellowish oil. This oil was dissolved in 100 ml. of petroleum ether, the solution was chromatographed on 40 g. acid-washed alumina, and the alumina column was developed with petroleum ether, petroleum ether-ethyl ether, ethyl ether, and ethyl ether-methanol. The eluates obtained utilizing 2 to 4% of methanol in ethyl ether were evaporated to dryness, and the residual material was recrystallized from methanol to give substantially pure $\Delta^{8(9),22}$-3-hydroxy-7-keto-ergostadiene; M.P. 175–179° C.; $[\alpha]_D = -39.6°$ (chloroform); $\lambda$ max. $=2545$ A., E percent$=212$ (methanol).

EXAMPLE 2

Thirty grams (0.068 mole) of $\Delta^{7,22}$-3-acetoxy-ergostadiene were dissolved in 750 ml. of dry chloroform, and the solution was cooled to a temperature between about $-60$ and $-65°$ C. To this solution was added, dropwise over a period of approximately one hour while maintaining the temperature of the solution at approximately $-60$ to $-65°$ C., a solution containing 33.5 g. (0.21 mole) of bromine in 750 ml. of dry chloroform. The resulting solution was stirred for an additional period of ninety minutes while maintaining the temperature at about $-65°$ C. Three 50-milliliter aliquots of this cold reaction solution, each containing the equivalent of 1.19 g. (0.00252 mole) of the $\Delta^{7,22}$-3-acetoxy-ergostadiene starting material were taken and treated as follows:

*Aliquot 1*

The first 50-milliliter aliquot of the reaction solution was added to an aqueous acetone solution containing 5 ml. of water and 145 ml. of acetone which had been previously cooled to a temperature of approximately $-50°$ C. The resulting solution was maintained at a temperature of $-50°$ C. for a period of about one hour, during which time a heavy precipitate formed. The resulting slurry was warmed to room temperature, filtered, and the solid product was dried to give $\Delta^{8(9)}$-3-acetoxy-7,11,22,23-tetrabromo-ergostene; M.P. 126–127° C.

*Aliquot 2*

The second 50-milliliter aliquot of the reaction solution was added to a cold suspension of 4.7 g. (0.020 mole) of silver oxide in 5 ml. of water and 145 ml. of acetone. The resulting mixture was maintained at a temperature of about $-60$ to $-65°$ C. for a period of approximately one hour, and the mixture was then allowed to warm to room temperature. The reaction mixture was filtered, the filtered solution was washed with water, and the water-washed chloroform solution was divided into two nearly equal portions. (1) The first portion of the water-washed chloroform solution was evaporated to dryness in vacuo to give approximately 1.13 g. of a tan solid. This material was washed with a small amount of methanol to give, in the form of a very light yellow powder, $\Delta^{8(9)}$-3-acetoxy-7-keto-22,23-dibromo-ergostene admixed with a small amount of $\Delta^{9(11)}$-3-acetoxy-7-keto-22,23-dibromo-ergostene; $\lambda$ max.$=2535$ A., E percent$=126$. (2) The second portion of the water-washed chloroform solution was brought into contact with zinc dust and acetic acid and the mixture allowed to react at room temperature. The reaction mixture was filtered, and the filtered solution was washed with water. The resulting chloroform solution was evaporated to dryness in vacuo, and the residual material was washed with a small amount of methanol to give $\Delta^{8,22}$-3-acetoxy-7-keto-ergostadiene admixed with a small amount of $\Delta^{9(11),22}$-3-acetoxy-7-keto-ergostadiene; $\lambda$ max.$=2520$ A.; E percent$=114$.

*Aliquot 3*

A third 50 milliliter aliquot of the cold bromine reaction mixture was added to a cold suspension of 7.0 g. (0.041 mole) of silver nitrate in 5 ml. of water and 145 ml. of acetone. The resulting mixture was swirled frequently over a period of one hour while maintaining the temperature at approximately $-60°$ C., and was then allowed to warm to room temperature. The reaction mixture was filtered, the filtered solution was washed with water and the water-washed choroform solution was divided into two approximately equal portions. (1) The first portion of this solution was evaporated to dryness in vacuo to give 1.22 g. of a tan solid which was washed with a small amount of methanol to give crude $\Delta^{8(9)}$-3-acetoxy-7-keto-22,23-dibromo-ergostene which was obtained in the form of a colorless powder; M.P. 198–208° C.; $\lambda$ max.$=2510$ A.; E percent$=104$. (2) The second portion of the water-washed chloroform solution was brought into contact with zinc dust and acetic acid and the mixture allowed to react at room temperature. The reaction mixture was filtered, and the filtered solution was washed with water. The resulting chloroform solution was evaporated to dryness in vacuo, and the residual material was washed with methanol to give crude $\Delta^{8(9),22}$-3-acetoxy-7-keto-ergostadiene admixed with a small amount of $\Delta^{9(11),22}$-3-acetoxy-7-keto-ergostadiene; $\lambda$ max.$=2515$ A.; E percent$=100$.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a $\Delta^7$-allo-cyclopentanopolyhydrophenanthrene compound, selected from the group which consists of $\Delta^{7,22}$-3-hydroxy-ergostadiene, $\Delta^7$-dehydrotigogenin, and 3-lower alkanoyl esters thereof, with a halogenating agent selected from the group which consists of chlorinating and brominating agents to produce the corresponding polyhalogenated steroid compound, and reacting this compound, in an aqueous medium, with a compound of a metal, said compound being characterized as having a cation which forms water-insoluble halides, thereby producing the corresponding $\Delta^{8(9)}$-7-keto-cyclopentanopolyhydrophenanthrene compound.

2. The process which comprises reacting $\Delta^{7,22}$-3-acetoxy-ergostadiene with bromine to produce $\Delta^8$-3-acetoxy-7,11,22,23-tetrabromo-ergostene, reacting this compound with silver nitrate to produce $\Delta^{8(9)}$-3-acetoxy-7-keto-22,23-dibromo-ergostene, and reacting said $\Delta^{8(9)}$-3-acetoxy-7-keto-22,23-dibromo-ergostene with zinc dust and acetic acid to produce $\Delta^{8,22}$-3-acetoxy-7-keto-ergostadiene.

3. The process which comprises reacting $\Delta^{7,22}$-3-acetoxy-ergostadiene with N-bromamide to produce $\Delta^8$-3-acetoxy-7,11,22,23-tetrabromo-ergostene, reacting this compound with silver nitrate to produce $\Delta^{8(9)}$-3-acetoxy-7-keto-22,23-dibromo-ergostene, and reacting said $\Delta^{8(9)}$-3-acetoxy-7-keto-22,23-dibromo-ergostene with zinc dust and acetic acid to produce $\Delta^{8,22}$-3-acetoxy-7-keto-ergostadiene.

4. The process which comprises reacting $\Delta^{7,22}$-3-acetoxy-ergostadiene with N-chloramide to produce $\Delta^8$-3-acetoxy-7,11,22,23-tetrachloro-ergostene, reacting this compound with silver nitrate to produce $\Delta^{8(9)}$-3-acetoxy-7-keto-22,23-dichloro-ergostene, and reacting said $\Delta^{8(9)}$-3-acetoxy-7-keto-22,23-dichloro-ergostene with zinc and acetic acid to produce $\Delta^{8,22}$-3-acetoxy-7-keto-ergostadiene.

5. The process which comprises reacting $\Delta^7$-dehydrotigogenin acetate with bromine to produce $\Delta^{8(9)}$-7,11-dibromo-dehydrotigogenin acetate, and reacting this compound with silver nitrate to produce $\Delta^{8(9)}$-7-keto-dehydrotigogenin acetate.

6. The process which comprises reacting a $\Delta^{8(9)}$-7,11-dihalo-allo-cyclopentanopolyhydrophenanthrene compound, selected from the group which consists of $\Delta^{8(9)}$-7,11,22,23-tetrahalo-3-hydroxy-ergostene, $\Delta^{8(9)}$-7,11-dihalo-dehydrotigogenin, and 3-lower alkanoyl esters thereof, in an aqueous medium, with a compound of a metal, said compound being characterized as having a cation which forms water-insoluble halides, thereby producing the corresponding $\Delta^{8(9)}$-7-keto-cyclopentanopolyhydrophenanthrene compound.

7. The process which comprises reacting $\Delta^{8(9)}$-3-acetoxy-7,11,22,23-tetrabromo-ergostene with silver nitrate to produce $\Delta^{8(9)}$-3-acetoxy-7-keto-22,23-dibromo-ergostene.

8. The process which comprises reacting $\Delta^{8(9)}$-7,11-dibromo-tigogenin acetate with silver nitrate to produce $\Delta^{8(9)}$-7-keto-dehydrotigogenin acetate.

9. $\Delta^{8(9)}$-3-(lower alkanoyloxy)-7-keto-22,23-dihalo-ergostene.

10. $\Delta^{8(9)}$-3-hydroxy-7-keto-22,23-dihalo-ergostene.

11. $\Delta^{8(9)}$-3-acetoxy-7-keto-22,23-dibromo-ergostene.

12. $\Delta^{8(9)}$-3-hydroxy-7-keto-22,23-dibromo-ergostene.

13. $\Delta^{8(9)}$-7-keto-dehydrotigogenin-3-(lower alkanoate).

14. $\Delta^{8(9)}$-7-keto-dehydrotigogenin acetate.

15. $\Delta^{8(9)}$-7-keto-allosteroids selected from the group which consists of $\Delta^{8(9)}$-7-keto-22,23-dihalo ergostene, $\Delta^{8(9)}$-7-keto-dehydro-tigogenin, and 3-lower alkanoyl esters thereof.

References Cited in the file of this patent

UNITED STATES PATENTS

| 2,340,388 | Inhoffen | Feb. 1, 1944 |
| 2,602,769 | Murray | July 8, 1952 |
| 2,734,897 | Chemerda | Feb. 14, 1956 |

OTHER REFERENCES

Elsevier's Encyclopedia of Organic Chemistry, Series III, vol. 14, Supplement 1952, page 1272S.